United States Patent

Galuszka

(10) Patent No.: US 8,565,717 B2
(45) Date of Patent: Oct. 22, 2013

(54) MOBILE TELEPHONE EQUIPPED FOR ACTIVATION OF AN EMERGENCY MODE

(76) Inventor: Andrzej Jaroslaw Galuszka, Remich (LU)

( * ) Notice: Subject to any disclaimer, the term of this patent is extended or adjusted under 35 U.S.C. 154(b) by 91 days.

(21) Appl. No.: 13/512,669

(22) PCT Filed: Nov. 30, 2010

(86) PCT No.: PCT/EP2010/068488
§ 371 (c)(1),
(2), (4) Date: May 30, 2012

(87) PCT Pub. No.: WO2011/064380
PCT Pub. Date: Jun. 3, 2011

(65) Prior Publication Data
US 2012/0238238 A1    Sep. 20, 2012

(30) Foreign Application Priority Data
Nov. 30, 2009   (LU) .......................................... 91625

(51) Int. Cl.
*H04M 1/02*       (2006.01)

(52) U.S. Cl.
USPC ....... 455/404.2; 455/574; 455/74.1; 455/565; 455/404.1; 340/539.1; 340/537; 379/369; 379/370

(58) Field of Classification Search
USPC ........ 455/403–404.2, 411, 575.1, 575.6, 425, 455/565, 574, 74.1; 379/369, 370; 340/537, 340/539.1
See application file for complete search history.

(56) References Cited

U.S. PATENT DOCUMENTS

| | | | |
|---|---|---|---|
| 4,507,654 A * | 3/1985 | Stolarczyk et al. | 340/545.3 |
| 5,084,696 A * | 1/1992 | Guscott et al. | 340/541 |
| 5,365,570 A | 11/1994 | Boubelik | |
| 5,523,740 A * | 6/1996 | Burgmann | 340/573.4 |

(Continued)

FOREIGN PATENT DOCUMENTS

| | | |
|---|---|---|
| EP | 0920225 B1 | 1/2005 |
| JP | 7183970 A | 7/1995 |
| JP | 11284711 A | 10/1999 |
| JP | 2004040339 A | 2/2004 |

OTHER PUBLICATIONS

International Search Report; International Application No. PCT/EP2010/068488; International Filing Date Nov. 30, 2010; Mail date Mar. 4, 2011.

(Continued)

*Primary Examiner* — Mahendra Patel
(74) *Attorney, Agent, or Firm* — Cantor Colburn LLP

(57) ABSTRACT

A mobile telephone equipped for activation of an emergency mode comprises a housing, a detection circuit triggered, especially interrupted, from outside the housing and a strap member cooperating with the detection circuit for triggering, especially interrupting, the detection circuit upon pulling the strap member off the housing. An electronic control unit of the telephone monitors triggering of the detection circuit, to activate an emergency mode in case of such triggering and to automatically perform emergency operations in the emergency mode. The strap member comprises a strap, a first connector attached to the strap and a bridging circuit portion. The housing comprises a second connector that cooperates with the first connector for fastening the strap member to the housing. The connectors are configured as mating snap-fit connectors, with the connector or of the strap member comprising at least two bridging circuit terminals.

21 Claims, 1 Drawing Sheet

(56) References Cited

U.S. PATENT DOCUMENTS

| | | | |
|---|---|---|---|
| 5,680,441 A | * | 10/1997 | Gallo .......................... 455/74.1 |
| 5,793,291 A | * | 8/1998 | Thornton ................... 340/573.1 |
| 6,166,625 A | * | 12/2000 | Teowee et al. ........... 340/426.26 |
| 6,222,442 B1 | * | 4/2001 | Gager et al. .............. 340/426.29 |
| 6,480,103 B1 | * | 11/2002 | McCarthy et al. ......... 340/425.5 |
| 6,741,165 B1 | * | 5/2004 | Langfahl et al. ........... 340/426.1 |
| 2005/0023858 A1 | * | 2/2005 | Bingle et al. .................... 296/76 |
| 2006/0215035 A1 | * | 9/2006 | Kulas ....................... 348/207.99 |
| 2007/0125386 A1 | * | 6/2007 | Quinn ...................... 128/207.11 |

OTHER PUBLICATIONS

Written Opinion; International Application No. PCT/EP2010/068488; International Filing Date Nov. 30, 2010; Mail date Mar. 4, 2011.

* cited by examiner

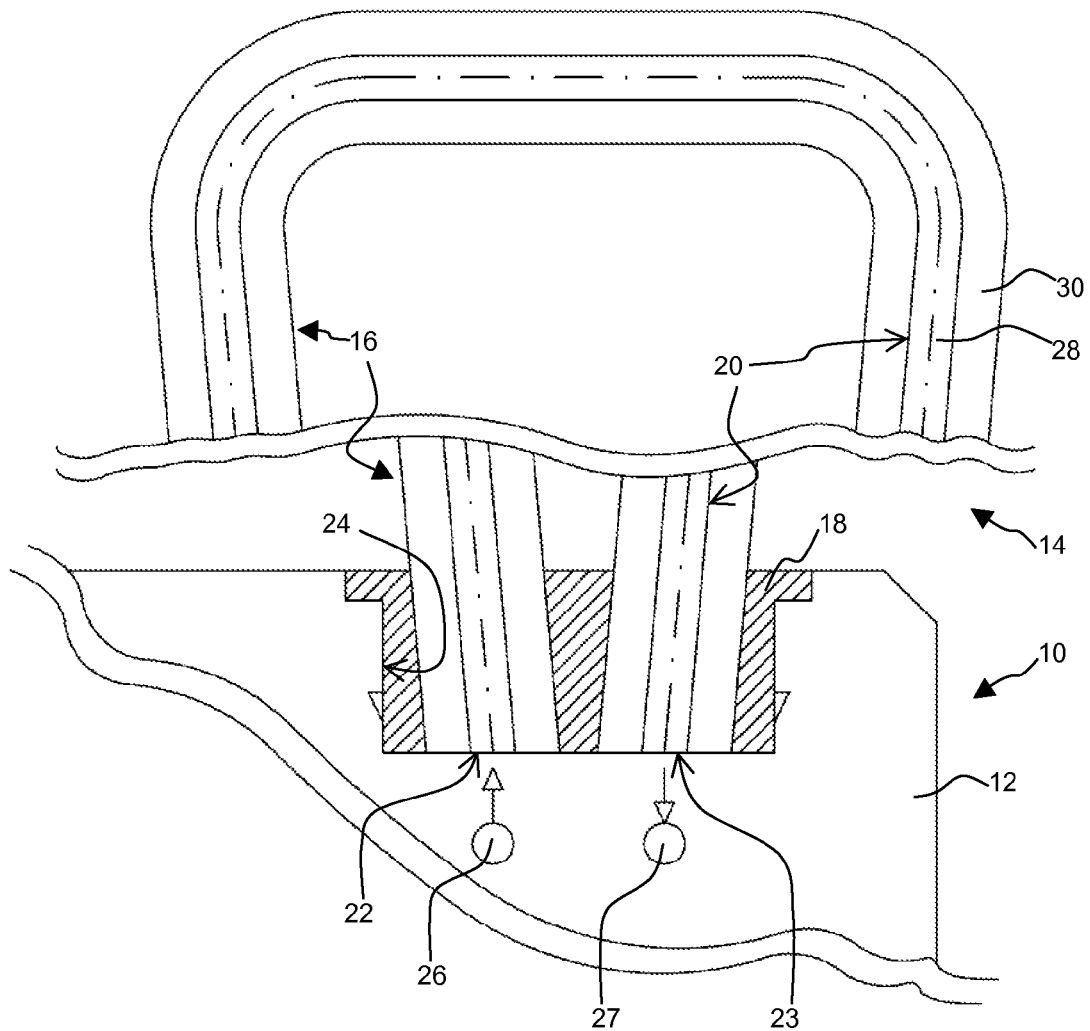

MOBILE TELEPHONE EQUIPPED FOR ACTIVATION OF AN EMERGENCY MODE

TECHNICAL FIELD

The present invention generally relates to a mobile telephone, i.e. a portable cellular or satellite telephone, and more specifically to a mobile telephone equipped for activation of an emergency mode, in which the telephone automatically performs emergency operations.

BACKGROUND ART

It is well known that the ubiquitous advent of mobile telephones has had a beneficial impact on safety and health since, in case of emergency situations, mobile telephones allow setting of emergency calls instantly and at virtually any location.

The capabilities of modern mobile phones have led to further developments intended to improve the user's health and safety, or at least the reliability and swiftness, with which help or first-aid can be called. One such improvement are mobile phones enhanced with an "one push" emergency-only-key. Such a mobile phone is suggested for instance in Japanese patent application JP 7 183970, which proposes a portable cellular phone capable of activating an emergency call if the user presses the emergency-only-key. When this key is pressed, a line is connected to a specific destination, which is stored in the phone as emergency call receiver, and information, such as the user's details and the address of the current base station (network cell), is transmitted automatically to the destination. Another mobile phone of this kind is known e.g. from U.S. Pat. No. 5,365,570.

A drawback of this approach is that, in order to set off an emergency call, relatively conscious and controlled user interaction is required, which under certain circumstances—e.g. when a user feels panic or is incapable to properly handle the phone—may prove difficult if not impossible. Moreover, this approach is prone to generate a majority of unintended emergency calls due to inadvertent or accidental pushing of the dedicated emergency-only-key.

An alternative solution that allows more easily setting off an emergency call and/or sounding an acoustic alarm, e.g. an "anti mugging alarm", by means of a mobile telephone is disclosed in European patent no. 0 920 225.

The telephone according to EP 0 920 225 comprises a housing, a detection circuit configured for being interrupted from outside the housing, a strap member and an electronic control unit. The strap member cooperates with the detection circuit for interrupting the detection circuit upon pulling the strap member off the housing. The control unit is configured to monitor interruption of the detection circuit, to activate an emergency mode in case of interruption and to automatically perform emergency operations in this emergency mode. The detection circuit of EP 0 920 225 includes a first conductor that is grounded and a second conductor that is pulled up to higher potential. In the absence of an emergency, the first conductor and the second conductor, which are configured in the form of springs, are constantly in contact with each other so that the control unit measures a ground potential. The strap itself is wrapped immediately around the spring-like first and second conductors. When the user pulls the strap from either conductor, they are brought out of contact. Consequently, in the event of an emergency, the emergency input detection signal changes to pull-up potential so that a pulse is generated that is detected by the electronic control unit. So long as an emergency input can be entered by simple removal of a strap, a user can instantaneously indicate an emergency through use of the portable cellular phone according to EP 0 920 225.

Whereas the approach of EP 0 920 225 facilitates user activation of an emergency mode, its configuration has several drawbacks. Among others, it is not readily suitable as a retrofit or optional enhancement for mass production mobile phones, in case of which not every user may desire the presence of a strap and a "rapid-action" emergency feature. Furthermore, the suggested approach is also inadequate to allow discerning inadvertent or accidental activation from a true emergency situation.

Japanese patent application JP 11 284 711 also discloses a mobile telephone equipped for activation of an emergency mode, with a housing, a detection circuit configured for being triggered from outside and a strap member for triggering. This phone also has appears to have an electronic control unit that is configured 1) to monitor triggering of the detection circuit, 2) to activate an emergency mode accordingly, and 3) to automatically perform emergency operations in such an emergency mode. As opposed to EP 0 920 225, the strap member according to JP 11 284 711 does not only have a strap but also a first mechanical connector attached to the strap, Correspondingly, there is a second mechanical connector on the housing that cooperates with the first connector for fastening the strap member to the housing. When the strap is pulled off, the strap-side connector is detached so that an annular conductor provided on a retainer-shaped base part of the strap member bridges a detection circuit. Whereas this design might improve avoidance or discerning of inadvertent or accidental activation, it still does not enable a low-cost retrofit or optional mass production enhancement for mobile phones.

BRIEF SUMMARY

The invention provides an improved mobile telephone equipped for activation of an emergency mode, which overcomes at least part of abovementioned drawbacks of the prior art, and in particular, which provides a low-cost mobile phone enhancement suitable as optional/retrofit enhancement.

The present invention relates to a mobile telephone equipped for activation of an emergency mode. In a manner known per se, it comprises a housing for protecting the internal electronic components, a detection circuit that is configured for being activated, preferably for being interrupted, from outside the housing and a strap member cooperating with the detection circuit for triggering the detection circuit by pulling the strap member so as to detach it from the housing. Furthermore, an electronic control unit of the telephone, e.g. its inherent processor, is configured—using suitable connections and software—inter alia to monitor triggering of the detection circuit, to activate an emergency mode in case of such triggering, especially a circuit interruption, and to automatically perform predetermined emergency operations when the emergency mode is activated. The strap member comprises a strap—which is ideally flexible and may be in the form of a simple tag-shaped band or in the form of a loop—a first connector (e.g. a male plug), to which the strap is attached, and a bridging circuit portion. Correspondingly, the housing comprises a second connector (e.g. a female socket) that cooperates with the first connector for mechanically fastening the strap member to the housing.

According to the invention, the first and second connector are respectively configured as mating snap-fit connectors, with the first connector on the strap member having two bridging circuit terminals, preferably inside the connector. Accordingly, the bridging circuit passes from one of said two bridging circuit terminals via at least the first connector, and preferably further inside and through said strap, to the other of said two bridging circuit terminals. Correspondingly, the detection circuit includes at least two detection circuit terminals, which are arranged in or adjacent the second connector, for cooperating with the bridging circuit terminals of the first connector. As will be appreciated, when the strap member is fastened to the housing, the bridging circuit terminals respectively connect to the detection circuit terminals so as to close the detection circuit. The closed circuit condition is used to determine a normal non-emergency state. Further according to the invention, if the bridging circuit portion is removed or opened, especially due to the strap member being pulled off the housing or due to the strap itself being cut open or ripped apart, a long-term interruption of the detection circuit is caused, i.e. an open-circuit condition, which can be reliably detected. This condition prevails until the strap member is properly reconnected or replaced so that reliable detection of an emergency is enabled.

As will be understood, the proposed strap member, in the manner of an electrically bridging jumper, allows removing part of the detection circuit, namely the bridging circuit portion, and thus interrupting the detection circuit reliably and in long-term manner. As a corollary, the mobile phone is capable of detecting presence or absence of a properly connected strap member so that, given a default configuration of the phone devoid of the emergency mode activation feature, retrofitting a strap member to the phone allows automatically enabling the emergency mode activation feature. Moreover, the proposed approach allows relatively rapid re-connection of the strap member (i.e. putting the strap member back into place) to enable aborting or canceling activation of the emergency mode, e.g. combined with a suitable user input using the telephone keys—such as confirming and entering the PIN for safety reasons. As will further be appreciated, the proposed configuration is reliable, suitable as an optional add-on or retrofit, while being suitable for mass-production at comparatively low unit cost of both the phone and the strap.

The present invention also proposes a kit-of-parts which is to be used as an optional enhancement for a portable mobile communication device, especially a mobile phone, according to the invention.

BRIEF DESCRIPTION OF THE DRAWINGS

A preferred embodiment of the invention will now be described, by way of example and in non-limiting manner, with reference to the accompanying drawing:

FIG. 1 is a schematic vertical cross sectional view of an upper left region of a mobile telephone illustrating a strap member for activation of an emergency mode.

DETAILED DESCRIPTION

FIG. 1 partially and schematically shows a mobile phone e.g. a GSM or UMTS based cellular phone, generally identified by reference numeral 10, more specifically the upper right corner of the housing 12 of the mobile phone 10.

As seen in FIG. 1, a strap member 14 with a loop-shaped strap 16 is fastened to the housing 12. More specifically, the strap member 14 includes a first connector 18 that serves as mechanical fastener, preferably of the snap-fit type, e.g. a male plug of a suitable small-size snap-fit or clip-fastened connector pair, to which both end portions of the loop-shaped strap 16 are fixedly and individually attached. As an alternative embodiment, the strap 16 may have any suitable shape that permits manual grasping, e.g. that of a flat tab-shaped band, preferably provided with means for attaching the strap 16 (and therewith the mobile phone 10) to an external item. The strap 16 may e.g. be configured as a flexible wrist strap or necklace of any suitable base material, e.g. textile, plastics, leather, etc. As further seen in FIG. 1, the strap member 14 includes any suitable conductor forming a circuit portion, more specifically a bridging circuit portion 20 that bridges (shorts) two bridging circuit terminals 22, 23. The terminals 22, 23 are arranged at, on or in the first connector 18 of the strap member 14, more specifically at or near the front end of the first connector 18.

As shown in FIG. 1, the mobile phone 10 is further equipped with a second connector 24, e.g. a female socket of a standard small-size snap-fit connector pair. The second connector 24 is fixed to the housing 12 in any appropriate border region of the mobile phone 12, e.g. the upper right corner as in FIG. 1, and sunk in so as to protect the contacts and avoid impediment. The second connector 24 cooperates with the first connector 18 of the strap member for easily fastening the strap member 18 including the strap 16 to the housing 12 of the mobile phone 10. As connectors (plug+receptacle) 18, 24 any suitable mechanical fastener pair can be used, provided it serves to keep pairs of at least two terminals of a signal conductor (e.g. electrical or optical) in contact—as will become apparent below. Preferably, the connectors 18, 24 are configured to disconnect at a predetermined pulling force or tear-off force that lies in the range of m·6N/kg to m·14N/kg, preferably in the range of m·8N/kg to m·12N/kg, with m being the net weight of the mobile 10. This configuration allows self-induced detaching of the strap member 14 without any user intervention in case of an accident that involves a considerable shock causing high acceleration (e.g. >10 G), if the strap 16 is properly fastened, e.g. to a motorcycle or other vehicle (for traffic accident emergencies), to the user's body e.g. at the wrist or neck (e.g. for sports accident emergencies). Alternatively or as a combined requirement, the connectors 18, 24 are preferably configured to disconnect at a relatively low absolute pulling force chosen independently from the weight of the mobile 10. Suitably chosen connectors 18, 24, e.g. of the snap-fit type, enable such disconnection for instance at a force in the range of 10N to 30N, preferably in the range of 15N to 25N. Such a relatively low disconnection force allows pulling-off of the strap member 14 with little physical effort, which is beneficial especially for use by children or elderly people.

In a manner known per se, the mobile phone 10 comprises a detection circuit (not shown in full) that is operatively connected to an electronic control unit ECU (not shown) of the mobile phone 10, e.g. a core processor as typically present in a mobile phone to control phone operation. This ECU is configured to monitor interruption of the detection circuit, to activate an emergency mode in case of such interruption and to automatically perform emergency operations in the emergency mode. Suitable hardware and software on the basis of which such an ECU and the related detection circuit can be implemented on the phone side are well known to the skilled person, e.g. according to EP 0 920 225.

As is apparent from FIG. 1, the mobile phone 10 further comprises two terminals, namely detection circuit terminals 26, 27 of the mentioned phone-side detection circuit. The detection circuit terminals 26, 27 are arranged inside or adjacent the second connector 24 for cooperating respectively with the two bridging circuit terminals 22, 23 of the strap member 14.

As will be appreciated, the proposed mobile phone 10 is equipped in such a way that when the strap member 14 is properly fastened to the housing 12 by mating engagement of the connectors 18, 24, the bridging circuit terminals 22, 23 respectively connect to the detection circuit terminals 26, 27 so as to close i.e. to "short" the detection circuit via the conductor part of the bridging circuit portion 20 that extends between the two bridging circuit terminals 22, 23 and is arranged either to pass only via the first connector 18 or, more preferably, to pass furthermore inside and through the loop-shaped strap 16. Conversely, when the strap member 14 is pulled off i.e. detached from the housing 12, the bridging circuit portion 20 is removed so as to interrupt the detection circuit. Moreover, in case the bridging circuit portion 20 passes inside and through the loop-shaped strap 16, the strap 16 may be cut or ripped in a hazardous situation so as to interrupt the detection circuit (not fully shown).

In order to detect an emergency and trigger activation of a correspond preprogrammed emergency mode and its related emergency operations, the mobile telephone preferably comprises a transmitter (not shown) and a receiver (not shown). The transmitter is connected to one of the detection circuit terminals, e.g. terminal 26, for emitting signals to the one detection circuit terminal 26. The receiver is connected to the other detection circuit terminal 27 for receiving signals emitted by the transmitter from the latter terminal 27. Accordingly, in any suitable manner, the ECU is connected to the transmitter for controlling the transmitter to periodically emit signals and to the receiver for monitoring reception of the periodically emitted signals. In case one or several emitted signals have not been received properly (and on condition that the phone is set to operate the emergency activation enhancement), the ECU activates an emergency mode and automatically performs emergency operations. As noted above, the ECU is also configured to perform certain predefined emergency operations. These preferably include automatically transmitting preprogrammed information, such as the user's name and health relevant user information, and/or cyclically obtained information, such as position data or other safety or security relevant data, via a mobile communication service, such as SMS, MMS, GPRS, EDGE etc. to a preprogrammed destination, e.g. a dedicated emergency server station configured to cooperate with mobile phones 10 according to the invention. Accordingly, the mobile phone 10 preferably has an ECU that is configured to cyclically obtain and store (refresh or add) information related to the current environment, in particular to obtain audio data using the telephone microphone of the mobile telephone, to obtain video data using a standard picture camera of the mobile telephone (today present on most mobile phones) and/or to obtain position data using a navigation device, in particular a GPS satellite navigation receiver, of the mobile telephone. In emergency mode, the ECU may send such information only once initially, or periodically to the preprogrammed destination. In addition or alternatively, the mobile phone 10 may have an ECU configured to set of an emergency call ("911"/"112") and play a prerecorded and/or speech-synthesized message to the emergency operator, including the user name, relevant user related information (blood type, chronic diseases, etc.) and the last known location as determined using known base station-related positioning methods or, if provided, a GPS receiver. Furthermore, the mobile phone 10 may be configured to create an alarm in order to attract attention, e.g. in form of a "burglar alarm", by sounding the phone's speaker at high volume. Especially but not exclusively with the latter feature, the mobile phone is preferably equipped with a non-removable and non-accessible buffer battery that is dimensioned to warrant emergency operations in emergency mode during a sufficient time even when the removable main battery of the mobile phone 10 is removed.

In order to distinguish different types of emergency, e.g. an assault (safety) or a health-affecting situation (health), the mobile phone 10 may be provided with a higher number of detection circuit terminals 26, 27 and different types of strap members 16 may be used in conjunction with such a mobile phone 10, so that the phone is able to discern which kind of emergency the user is in (three terminals on the phone side allow using three different strap members for shorting the three possible combinations of two terminals).

Whereas a fully electrical detection circuit (and bridging circuit 20) is possible, in the preferred mode of execution shown in FIG. 1, both the bridging circuit portion 20 and at least a terminal portion of the detection circuit that is connected to the detection circuit terminals 26, 27 are made of optical waveguides. More specifically, the part of the bridging circuit portion 20 that passes through the loop-shaped strap 16 in between the bridging circuit terminals 22, 23 is made of optical fiber 28. Accordingly, the strap 16 has a flexible sheathing 30 for protecting the optical fiber 28. The sheathing 30, including the fiber 28, is preferably manufactured so that it can be torn apart i.e. ruptured manually, more preferably, comprises a predetermined breaking point, that ruptures at a force slightly exceeding the pulling force required for disconnecting the connectors 18, 24 for additional safety and reliable interruption.

In conclusion, it may be noted that a mobile phone 10 equipped with a detection circuit and, especially with a "rip cord"-like or "snatch plug"-like strap member 14 according to the invention has among others the following further benefits:

its use is easy, safe and reliable in any kind of emergency, including natural disasters (such as earthquake, flood, fire), accidents (work-related, traffic-related, or domestic accidents), health-related emergencies (e.g. heart-attack, apoplexy, circulatory collapse, etc.) and criminal offenses such as a hold-up, a violent assault;

the speed of issuing the help request/alarm is improved;

optionally, the type of help requested may be specified automatically; and as a consequence, the speed and quality of received help improves.

The invention claimed is:

1. A mobile telephone equipped for activation of an emergency mode, said mobile telephone comprising a housing, a detection circuit configured for being triggered from outside said housing, a strap member cooperating with said detection circuit for triggering said detection circuit and an electronic control unit configured to monitor triggering of said detection circuit, to activate an emergency mode in case of such triggering and to automatically perform emergency operations in said emergency mode;

said strap member comprising a strap, a bridging circuit portion and a first connector attached to said strap;

said housing comprising a second connector cooperating with said first connector for fastening said strap member to said housing;

wherein said first connector and said second connector are respectively configured as mating snap-fit connectors, the mating snap-fit connectors being configured to disconnect based on a pulling force;

wherein said first connector comprises at least two bridging circuit terminals, said bridging circuit portion passing from one of said two bridging circuit terminals via said first connector to the other of said two bridging circuit terminals;

wherein said detection circuit includes at least two detection circuit terminals arranged for cooperating with said bridging circuit terminals;

wherein said bridging circuit terminals respectively connect to said detection circuit terminals so as to close said detection circuit when said strap member is fastened to said housing, and wherein said detection circuit is interrupted when said strap member is pulled off said housing or when said strap is cut or ripped.

2. The mobile telephone according to claim 1, wherein said bridging circuit portion and at least a terminal portion of said detection circuit are made of optical waveguides.

3. The mobile telephone according to claim 1, wherein said strap is loop-shaped and has two end portions that are individually attached to said first connector.

4. The mobile telephone according claim 1, wherein said bridging circuit portion is removed so as to interrupt said detection circuit when said strap member is pulled off said housing.

5. The mobile telephone according to claim 2, wherein said bridging circuit portion is removed so as to interrupt said detection circuit when said strap member is pulled off said housing and wherein said bridging circuit portion passes internally through said loop-shaped strap and is made of optical fiber.

6. The mobile telephone according to claim 5, wherein said strap comprises a flexible sheathing for protecting said optical fiber.

7. The mobile telephone according to claim 1, wherein said first connector and said second connector are configured to disconnect at the pulling force in the range of m·6N/kg to m·14N/kg, with m being the net weight of the mobile telephone.

8. The mobile telephone according to claim 1, wherein said first connector and said second connector are configured to disconnect at the pulling force in the range of 10N to 30N.

9. The mobile telephone according to claim 1, wherein said first connector is a male plug connector and wherein said second connector is a female socket connector.

10. The mobile telephone according to claim 1, wherein said strap is flexible.

11. The mobile telephone according to claim 1, wherein said mobile telephone comprises a transmitter connected to one of said detection circuit terminals for emitting signals to said one detection circuit terminal and a receiver connected to the other of said detection circuit terminals for receiving signals emitted by said transmitter and received at said other detection circuit terminal, said electronic control unit being connected to said transmitter for controlling said transmitter to periodically emit signals and to said receiver for monitoring reception of said periodically emitted signals.

12. The mobile telephone according to claim 1, wherein said electronic control unit is configured to perform emergency operations that include automatically transmitting preprogrammed and/or cyclically obtained information via a mobile communication service to a preprogrammed destination.

13. The mobile telephone according to claim 12, wherein said electronic control unit is configured to cyclically obtain and store information related to a current environment of said mobile telephone.

14. The mobile telephone according to claim 1, further comprising a removable main battery and a non-removable buffer battery that is dimensioned to warrant emergency operations in said emergency mode when said removable main battery is removed.

15. Kit of parts for a portable mobile communication device that is equipped for activation of an emergency mode and comprises a housing, a detection circuit configured for being interrupted from outside said housing and an electronic control unit configured to monitor interruption of said detection circuit, to activate an emergency mode in case of such interruption and to automatically perform emergency operations in said emergency mode, said kit comprising:

a strap member that comprises a strap, a first connector, which is attached to said strap and comprises at least two bridging circuit terminals, and a bridging circuit portion that passes from one of said two bridging circuit terminals via said first connector to the other of said two bridging circuit terminals, said first connector being a snap-fit mating with a second snap-fit connector provided in the housing of said mobile device, the snap-fit mating being configured to disconnect based on a pulling force, said strap member being configured so that said bridging circuit terminals respectively connect to and cooperate with at least two detection circuit terminals at said second connector so as to close said detection circuit when said strap member is fastened to said housing, and so that removal or interruption of said bridging circuit portion interrupts said detection circuit when said strap member is pulled off said housing or when said strap is cut or ripped.

16. The mobile telephone according to claim 1, wherein said bridging circuit portion passes from one of said two bridging circuit terminals via said first connector inside and through said strap.

17. The mobile telephone according to claim 5, wherein said sheathing is manually tearable.

18. The mobile telephone according to claim 17, wherein said sheathing comprises a predetermined breaking point.

19. The mobile telephone according to claim 10, wherein said strap is configured as a wrist strap.

20. The mobile telephone according to claim 13, wherein said information related to a current environment of said mobile telephone comprises at least one of audio data obtained using a microphone of said mobile telephone, video data obtained using a camera of said mobile telephone and position data obtained using a navigation device of said mobile telephone.

21. The kit of parts according to claim 15, wherein said bridging circuit portion passes from one of said two bridging circuit terminals via said first connector inside and through said strap.

* * * * *